(12) United States Patent
Ono

(10) Patent No.: US 10,086,562 B2
(45) Date of Patent: Oct. 2, 2018

(54) RESIN MEMBER AND METHOD FOR BONDING RESIN MEMBERS

(71) Applicant: FUJI JUKOGYO KABUSHIKI KAISHA, Tokyo (JP)

(72) Inventor: Tsubasa Ono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/007,075

(22) Filed: Jan. 26, 2016

(65) Prior Publication Data
US 2016/0214347 A1 Jul. 28, 2016

(30) Foreign Application Priority Data
Jan. 28, 2015 (JP) .................. 2015-013989

(51) Int. Cl.
*B29C 65/08* (2006.01)
*B29C 65/00* (2006.01)
(Continued)

(52) U.S. Cl.
CPC ........ *B29C 66/30223* (2013.01); *B29C 65/08* (2013.01); *B29C 66/1122* (2013.01); *B29C 66/21* (2013.01); *B29C 66/302* (2013.01); *B29C 66/3022* (2013.01); *B29C 66/322* (2013.01); *B29C 66/43* (2013.01); *B29C 66/73921* (2013.01); *B29C 66/81417* (2013.01); *B29C 66/8322* (2013.01); *B32B 3/26* (2013.01); *B32B 3/28* (2013.01); *B32B 3/30* (2013.01); *B32B 5/22* (2013.01); *B32B 5/26* (2013.01); *B32B 7/04* (2013.01); *B32B 7/045* (2013.01); *B32B 27/18* (2013.01); *B29C 66/71* (2013.01);
(Continued)

(58) Field of Classification Search
None
See application file for complete search history.

(56) References Cited

U.S. PATENT DOCUMENTS 5,263,606 A * 11/1993 Dutt ........................ B29C 65/08
156/272.2
5,298,098 A * 3/1994 Hoedl .................. B29C 65/0672
156/293
(Continued)

FOREIGN PATENT DOCUMENTS

| CN | 103203866 A | 7/2013 |
| JP | 61-115617 U | 7/1986 |

(Continued)

OTHER PUBLICATIONS

Definition of the term "Apex" from American Heritage Dictionary. Retrieved on Mar. 31, 2017.*
(Continued)

*Primary Examiner* — Z. Jim Yang
(74) *Attorney, Agent, or Firm* — Chip Law Group

(57) ABSTRACT

A resin member contains a thermoplastic resin and is bonded to another resin member by ultrasonic welding. The resin member includes: a melting start portion to which contact pressure is applied during the ultrasonic welding; a groove unit that is formed around a periphery of the melting start portion; and at least one wall that is formed so as to cross a direction from the melting start portion toward an outside and partitions the groove unit.

6 Claims, 9 Drawing Sheets

(51) Int. Cl.
*B32B 7/04* (2006.01)
*B32B 3/26* (2006.01)
*B32B 3/28* (2006.01)
*B32B 3/30* (2006.01)
*B32B 5/22* (2006.01)
*B32B 5/26* (2006.01)
*B32B 27/18* (2006.01)
*B32B 27/08* (2006.01)

(52) U.S. Cl.
CPC ........... *B32B 27/08* (2013.01); *B32B 2250/02* (2013.01); *B32B 2250/24* (2013.01); *B32B 2260/021* (2013.01); *B32B 2260/046* (2013.01); *B32B 2262/02* (2013.01); *B32B 2262/101* (2013.01); *B32B 2262/105* (2013.01); *B32B 2262/106* (2013.01); *B32B 2307/50* (2013.01); *B32B 2605/08* (2013.01); *Y10T 428/2457* (2015.01)

(56) References Cited

U.S. PATENT DOCUMENTS

| | | | | |
|---|---|---|---|---|
| 5,593,064 | A * | 1/1997 | Meshberg | B05B 11/0032 222/153.11 |
| 6,251,323 | B1 * | 6/2001 | Hoedl | B29C 43/146 264/254 |
| 6,703,129 | B1 * | 3/2004 | Kakehi | B29C 65/02 24/455 |
| 8,524,344 | B1 * | 9/2013 | Griffiths | B29D 22/003 123/184.21 |
| 9,327,668 | B1 * | 5/2016 | Roychoudhury | B60R 21/16 |
| 2002/0026943 | A1 * | 3/2002 | Castiglione | A62B 18/084 128/206.19 |
| 2003/0155062 | A1 * | 8/2003 | Kagan | B29C 66/1312 156/73.5 |
| 2004/0031803 | A1 * | 2/2004 | Matsui | B29C 65/08 220/678 |
| 2005/0067085 | A1 * | 3/2005 | Katayama | B29C 65/08 156/73.5 |
| 2005/0173044 | A1 * | 8/2005 | Drummond | B01D 53/268 156/69 |
| 2005/0217311 | A1 * | 10/2005 | Armer | A47J 41/0044 62/457.2 |
| 2005/0218123 | A1 * | 10/2005 | Hayakawa | B29C 65/1635 219/121.64 |
| 2006/0013975 | A1 * | 1/2006 | Sorensen | B32B 27/00 428/35.7 |
| 2006/0141350 | A1 * | 6/2006 | Dreyer | H01M 2/14 429/143 |
| 2007/0139498 | A1 * | 6/2007 | Chikamoto | B29C 65/606 347/93 |
| 2007/0141805 | A1 * | 6/2007 | Chang | B01L 3/502707 438/456 |
| 2008/0213135 | A1 * | 9/2008 | Burke | B29C 65/02 422/400 |
| 2009/0145949 | A1 * | 6/2009 | Aiso | B29C 65/0672 228/112.1 |
| 2009/0152326 | A1 * | 6/2009 | Shin | B29C 66/114 228/110.1 |
| 2010/0038363 | A1 * | 2/2010 | Kies | A01G 9/02 220/212 |
| 2010/0079970 | A1 * | 4/2010 | Prest | B29C 65/645 361/807 |
| 2010/0173161 | A1 * | 7/2010 | Beehag | B29C 65/0627 428/411.1 |
| 2013/0089709 | A1 * | 4/2013 | Zhu | B81C 1/00111 428/167 |
| 2014/0190962 | A1 * | 7/2014 | Lee | A47J 36/027 219/762 |
| 2014/0200679 | A1 * | 7/2014 | Bluecher | A61L 27/34 623/23.74 |
| 2015/0041047 | A1 * | 2/2015 | Wang | B23K 20/10 156/73.1 |
| 2015/0041070 | A1 * | 2/2015 | Wang | B29C 65/4815 156/580 |
| 2015/0144664 | A1 * | 5/2015 | Franssen | B29C 45/006 222/547 |
| 2015/0183154 | A1 * | 7/2015 | Kato | B01L 3/502707 156/64 |
| 2015/0192446 | A1 * | 7/2015 | Arai | G01F 15/14 73/273 |
| 2016/0038993 | A1 * | 2/2016 | Li | B21J 15/025 29/432.2 |
| 2016/0167288 | A1 * | 6/2016 | Rodgers | B29C 65/08 156/73.1 |
| 2016/0176103 | A1 * | 6/2016 | Rousseau | B29C 65/0672 403/270 |
| 2017/0015051 | A1 * | 1/2017 | Kurita | B29C 65/1632 |
| 2017/0036393 | A1 * | 2/2017 | Ishii | B29C 65/08 |
| 2017/0036848 | A1 * | 2/2017 | Chury | B29C 65/08 |

FOREIGN PATENT DOCUMENTS

| | | |
|---|---|---|
| JP | H10-156555 A | 6/1998 |
| JP | 2011-218583 A | 11/2011 |

OTHER PUBLICATIONS

Office Action received for Japanese Patent Application No. 2015-013989, dated Jun. 14, 2016, 5 Pages of Office Action Including 3 Pages of English translation.

Office Action Received for Chinese Patent Application No. 201610053335.9, dated Feb. 8, 2017, 8 Pages.

* cited by examiner

RESIN MEMBER AND METHOD FOR BONDING RESIN MEMBERS

CROSS-REFERENCE TO RELATED APPLICATIONS

The present application claims priority from Japanese Patent Application No. 2015-013989 filed on Jan. 28, 2015, the entire contents of which are hereby incorporated by reference.

BACKGROUND

1. Technical Field

The present invention relates to a resin member that contains a thermoplastic resin and is bonded to another resin member by ultrasonic welding and a method for bonding resin members.

2. Related Art

Structural parts of automobile bodies have conventionally been formed of metal materials such as steel materials. These days, to reduce the weight of the car body, structural parts that are formed of resin materials such as fiber-reinforced resins mixed with carbon fibers (CFRPs) are coming into use. The method for joining parts made of metal materials is roughly categorized into three methods. One is outfitting joining using bolts or the like, another is adhesion using an adhesive, and the other is fusion bonding by melting metal. Also when parts are formed of resin materials, strong bonding similar to that for parts made of metal materials is necessary. In particular, in the case of parts made of resin materials containing thermoplastic resins, a welding technology in which resin materials are melted to be bonded together is counted on.

Welding is a bonding method capable of strongly bonding parts without using a third interposed object as in outfitting joining using bolts or the like and adhesion using an adhesive. Of the types of welding, ultrasonic welding can melt the resin only in a portion that is intended to be bonded locally, and therefore has high applicability, such as with no need to consider the entire shapes of the parts. However, when parts made of resin materials are bonded by ultrasonic welding, there has been a case where the resin melted at the interface remains at the interface, and consequently the control of the thickness of the interface is difficult or the bonding strength is not stable.

In contrast, in Japanese Unexamined Patent Application Publication (JP-A) No. H10-156555, there is disclosed a welding method for bracket parts in which a melting portion and a groove running along the melting portion are formed on a welding surface of a bracket part made of resin, the welding surface is brought into contact with a surface of a base material, and vibration with pressure is applied to the melting portion from the back side of the welding surface of the bracket part. In the welding method, although the molten resin that has melted out diffuses and flows into the groove and part of the molten resin flows out to the surface of the bracket part, the molten resin that has melted out is forcedly poured into the groove by a ring-like planar portion of a recess provided on the ultrasonic horn. Thereby, the melting surface of the melting portion and the molten resin that has filled the interior of the groove become substantially the same surface, and the molten resin exhibits a function as an adhesive and the bracket part is integrated with the base material by welding.

However, the groove illustrated in the welding method for bracket parts described in JP-A No. H10-156555 is a ring-like groove surrounding the periphery of the melting portion, a groove of a configuration in which grooves are further extended radially from a ring-like groove, or grooves extending radially around the melting portion. That is, in the welding method described in JP-A No. H10-156555, a margin for escape of the surplus molten resin produced at the interface during welding is ensured by providing a relatively large groove; but when the groove is too large, an area where the bonding between the parts by using resin is insufficient may occur even in the area where the molten resin flows in.

Specifically, even in the area where the molten resin flows in, when the groove is too large, there is a concern that the molten resin is not completely charged into the space between the bottom of the groove and the surface of the base material of the bonding object, and the bonding strength is not enhanced. Therefore, although the thickness of the interface can be reduced, there is a concern that the molten resin is not stuck to the mutual parts while contributing to the bonding strength.

SUMMARY OF THE INVENTION

An aspect of the present invention provides a resin member that contains a thermoplastic resin and is bonded to another resin member by ultrasonic welding, the resin member including: a melting start portion to which contact pressure is applied during the ultrasonic welding; a groove unit that is formed so as to surround a periphery of the melting start portion; and at least one wall that is formed so as to cross a direction from the melting start portion toward an outside and partitions the groove unit at least partly into an inner portion and an outer portion.

A height of an apex of the wall with a bottom of the groove unit as a reference position may be lower than a height of the melting start portion.

The height of the apex of the wall with a bottom of the groove unit as a reference position may be lower than a height of a surface of the resin member located around an outer periphery of the groove unit.

The height of the apex of the wall may decrease as distance from the melting start portion increases.

A depth of the groove unit with a surface of the resin member as a reference position may be 1.0 mm or less.

The inner portion and the outer portion of the groove unit partitioned by the wall may be disposed concentrically.

A size of the melting start portion may correspond to a size of a tip of an ultrasonic welder used for the ultrasonic welding.

Another aspect of the present invention provides a method for bonding resin members that bonds two resin members containing a thermoplastic resin by ultrasonic welding, the method including: making bonding surfaces of the two resin members in contact with each other and supporting the bonding surfaces of the two resin members; and applying contact pressure to a melting start portion with a vibration element to bond the two resin members. At least one of the two resin members has, in a bonding area, a groove unit around the melting start portion to which contact pressure is applied during the ultrasonic welding and has at least one wall that is formed along a direction crossing a direction from the melting start portion toward an outside and partitions the groove unit at least partly into an inner portion and an outer portion.

DETAILED DESCRIPTION

Figure 1:
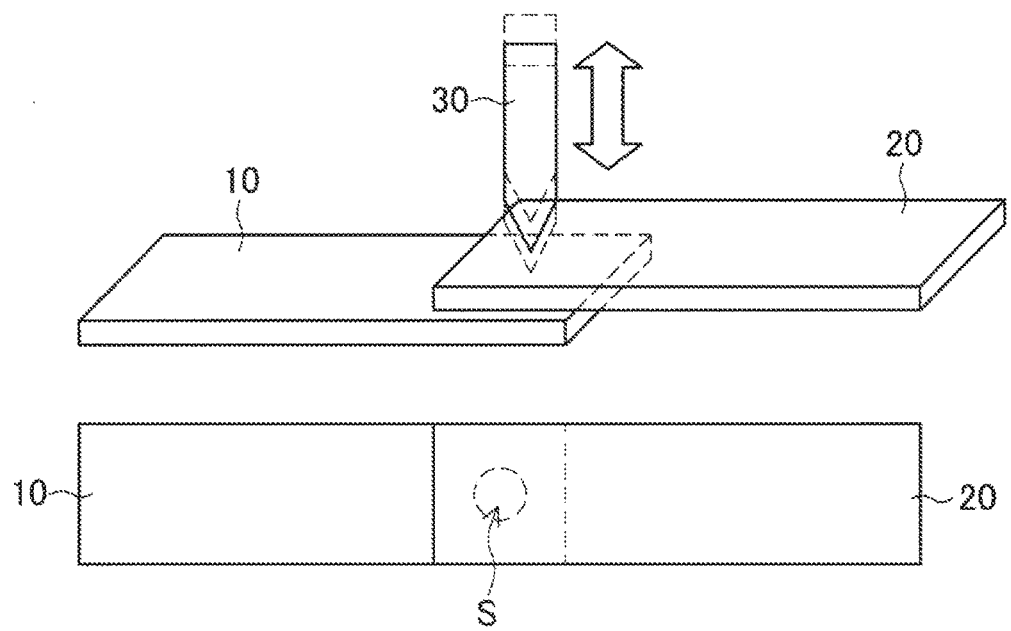
FIG. 1 is an illustration diagram illustrating a manner in which resin members are bonded by ultrasonic welding.

Hereinafter, preferred examples of the present invention will be described in detail with reference to the appended drawings. Note that, in this specification and the appended drawings, structural elements that have substantially the same function and structure are denoted with the same reference numerals, and repeated explanation of these structural elements is omitted. Further, in this specification and the appended drawings, a plurality of structural elements that have substantially the same function and structure may be distinguished by adding different alphabets after the same reference numeral. Conversely, when there is no particular need to distinguish each of a plurality of structural elements that have substantially the same function and structure, they are denoted with only the same reference numeral.

1. Resin Member

First, the configuration of a resin member according to an example of the present invention is described. The resin member is a member that is bonded to a member of the bonding object by ultrasonic welding. The ultrasonic welding is performed by, for instance as illustrated in FIG. 1, supporting a first resin member 10 and a second resin member 20 while making the bonding surfaces of the both members 10 and 20 in contact with each other and pressing a tip 30 of an ultrasonic welder from a surface of the second resin member 20 on the opposite side to the bonding surface. The resin member according to the example may be used as at least one of the first resin member 10 and the second resin member 20.

1-1. Constituent Material

The resin member is not particularly limited to the extent that it is used for ultrasonic welding and is a resin member containing a thermoplastic resin. For instance, the resin member may be a member that is made of a fiber-reinforced resin used for parts for automobile bodies. In the case of a member made of a fiber-reinforced resin, the reinforcing fibers used are not particularly limited; for instance, ceramic fibers used such as carbon fibers and glass fibers, organic fibers such as aramid fibers, and reinforcing fibers in which these are combined may be used. Of these, carbon fibers are preferably contained from the viewpoints of high mechanical properties, the ease of strength design, etc.

As a main component of the matrix resin of the fiber-reinforced resin that forms the first resin member 10, for instance, thermoplastic resins such as a polyethylene resin, polypropylene resin, polyvinyl chloride resin, ABS resin, polystyrene resin, AS resin, polyamide resin, polyacetal resin, polycarbonate resin, thermoplastic polyester resin, polyphenylene sulfide (PPS) resin, fluorine resin, polyetherimide resin, polyetherketone resin, and polyimide resin are illustrated. One or a mixture of two or more of these thermoplastic resins may be used. These thermoplastic resins may be a single kind, a mixture, or a copolymer. In the case of a mixture, a compatibilizing agent may be used in combination. In addition, a bromine-based fire retardant, a silicon-based fire retardant, red phosphorus, etc. may be added as a fire retardant.

In this case, as the thermoplastic resin used, for instance, resins such as a polyolefin-based resin such as polyethylene and polypropylene, a polyamide-based resin such as nylon 6 and nylon 66, a polyester-based resin such as polyethylene terephthalate and polybutylene terephthalate, a polyetherketone, a polyethersulfone, and an aromatic polyamide are given.

1-2. Configuration of Bonding Area

Figure 2:
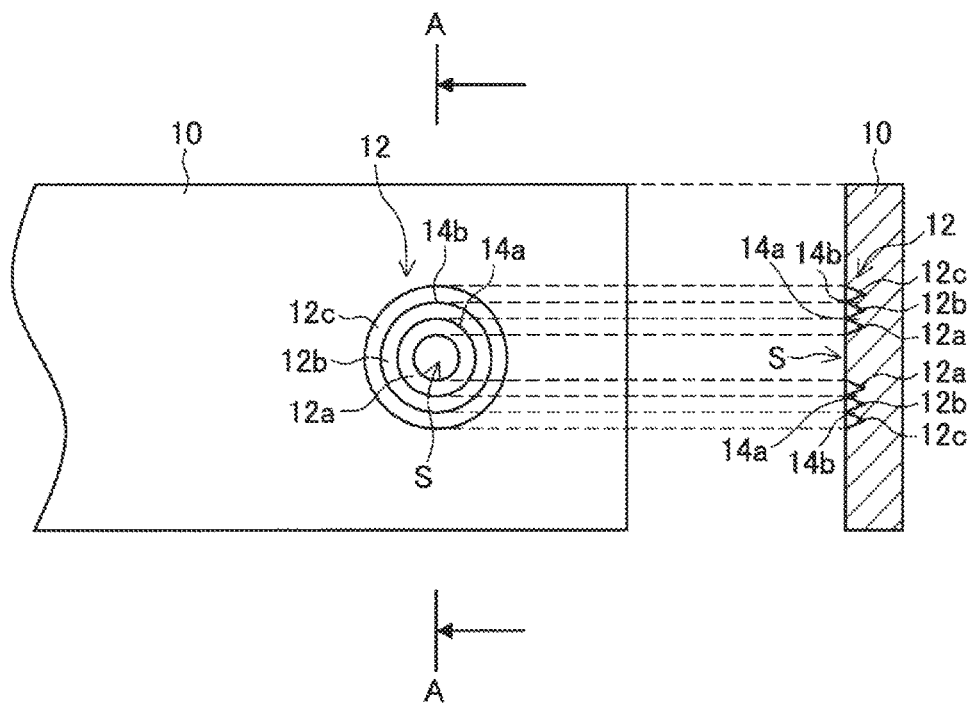
FIG. 2 is an illustration diagram illustrating a configuration of a resin member according to an example of the present invention.

FIG. 2 is an illustration diagram illustrating a bonding area of the first resin member 10. In FIG. 2, a plan view and a cross-sectional view illustrating a bonding area of the first resin member 10 are illustrated. The cross-sectional view is a diagram of the AA cross section in the plan view as viewed in the arrow direction. The first resin member 10 illustrated forms a plate-like shape, but the first resin member 10 is not limited to a plate-like shape but may be in various shapes.

(1-2-1. Melting Start Portion)

The first resin member 10 has a melting start portion S in the bonding area. The bonding area is an area that is disposed facing the second resin member 20 and is bonded to the second resin member 20 during ultrasonic welding. The melting start portion S is an area to which mainly contact pressure is applied during ultrasonic welding. The melting start portion S illustrated is formed in a circular shape. The external shape and size of the melting start portion S correspond to the external shape and size of the tip 30 of the ultrasonic welder (see FIG. 1).

The position of the upper surface of the melting start portion S coincides with the position of the surface of the most part of the bonding area of the first resin member 10. That is, the position of the upper surface of the melting start portion S coincides with the position of the surface of the first resin member 10 on the outside of a groove unit 12. When the surface of the melting start portion S is made to coincide with the position of the surface of the most part of the bonding area of the first resin member 10, the formation of the melting start portion S is easy. That is, the melting start portion S is formed by, after forming the first resin member 10, forming the groove unit 12 by cutting processing, engraving, etc.

The position of the upper surface of the melting start portion S may protrude from the position of the surface of the first resin member 10 on the outside of the groove unit 12. By protruding the surface of the melting start portion S, melting can be surely made from the melting start portion S during ultrasonic welding. When the surface of the melting start portion S is protruded, die molding is suitable to form the melting start portion S and the groove unit 12.

(1-2-2. Groove Unit and Wall)

The groove unit 12 that receives molten resin is provided around the melting start portion S. The groove unit 12 is formed so as to surround the periphery of the melting start portion S. In the example, the groove unit 12 is formed in a ring-like shape as a whole, and is partitioned into a first groove 12a, a second groove 12b, and a third groove 12c by a first wall 14a and a second wall 14b. The first wall 14a partitions the groove unit 12 into the first groove 12a of the inner portion and the second groove 12b and the third groove 12c of the outer portion. The second wall 14b partitions the groove unit 12 at least partly into the first groove 12a and the second groove 12b of the inner portion and the third groove 12c of the outer portion.

By the groove unit 12 being partitioned into inner portions and outer portions by the first wall 14a and the second wall 14b, the molten resin produced during ultrasonic welding flows from the first groove 12a successively into outer grooves while being intercepted by the first wall 14a and the second wall 14b. Therefore, the molten resin that flows out from the melting start portion S in a certain direction is first charged into the first groove 12a and then flows into the second groove 12b; and upon having been charged into the second groove 12b, further flows into the third groove 12c. Thus, in the groove unit where the molten resin flows in, the molten resin can surely contribute to the improvement in bonding strength.

The first wall 14a and the second wall 14b are formed so as to cross the direction from the melting start portion S toward the outside, and have a function of intercepting the molten resin. In the example, the first wall 14a and the second wall 14b are disposed concentrically with the melting start portion S as the center, and the first groove 12a, the second groove 12b, and the third groove 12c form a concentric circular configuration. By the first groove 12a, the second groove 12b, and the third groove 12c forming a concentric circular configuration, the molten resin is successively charged from the inner groove even when there is some variation in the position of molten resin production and the direction of inflow. Thereby, the molten resin can be made to surely contribute to the improvement in bonding strength.

In the groove unit 12, the cross-sectional shape of each of the grooves 12a, 12b, and 12c taken along the diameter direction with the melting start portion S as the center is not particularly limited. For instance, the cross-sectional shape of each of the grooves 12a, 12b, and 12c may be a substantially triangular shape in which the bottom of each of the grooves 12a, 12b, and 12c is a vertex. When the cross-sectional shape of the grooves 12a, 12b, and 12c is a substantially triangular shape, the corner portion in the grooves 12a, 12b, and 12c can be made small, and a space is less likely to be created in the grooves 12a, 12b, and 12c during the charge of molten resin.

At this time, the cross-sectional shape of the grooves 12a, 12b, and 12c and the walls 14a and 14b when the groove unit 12 is cut along the diameter direction with the melting start portion S as the center is preferably formed of a curved line that continues smoothly in a wavelike fashion. In the case of such a cross-sectional shape, a space is less likely to be created in the grooves 12a, 12b, and 12c during the charge of molten resin. Furthermore, in the case of such a cross-sectional shape, for instance when the first resin member 10 is formed by die molding, the processing of the grooves 12a, 12b, and 12c is easy.

Here, if the width of each of the grooves 12a, 12b, and 12c is too large, the charge of molten resin into each of the grooves 12a, 12b, and 12c may be insufficient, and the improvement in bonding strength may be insufficient. On the other hand, if the width of each of the grooves 12a, 12b, and 12c is too small, the first resin member 10 may be lifted from the second resin member 20 by the molten resin, and a space may be created. Hence, the width of each of the grooves 12a, 12b, and 12c is preferably in a range of 0.5 to 1.0 mm, and more preferably in a range of 0.6 to 0.9 mm.

The depth of the groove unit 12 with the surface of the first resin member 10 as a reference position is preferably 1.0 mm or less. If the depth of the groove unit 12 is more than 1 mm, the charge of molten resin into each of the grooves 12a, 12b, and 12c may be insufficient, and the improvement in bonding strength may be insufficient. On the other hand, if the depth of the groove unit 12 is too shallow, the first resin member 10 may be lifted from the second resin member 20 by the molten resin, and a space may be created. Hence, the depth of the groove unit 12 with the surface of the first resin member 10 as a reference position is preferably in a range of 0.5 to 1.0 mm, and more preferably in a range of 0.6 to 0.9 mm. The surface of the first resin member 10 serving as a reference position is a surface of the first resin member 10 which is superposed with the second resin member 20, and corresponds to, for instance, the surface of the first resin member 10 located on the outside of the groove unit 12.

Although in the illustrated instance the widths in the diameter direction of the first groove 12a, the second groove 12b, and the third groove 12c are the same, the widths may be different. For instance, the width of an outer groove far from the melting start portion S may be set smaller. Furthermore, although in the illustrated instance the depths of the first groove 12a, the second groove 12b, and the third groove 12c are the same, the depths may be different. For instance, the depth of an outer groove far from the melting start portion S may be set shallower. Thus, the volumes of all the grooves 12a, 12b, and 12c can be made equal, or the volume of an outer groove far from the melting start portion S can be made smaller; and even when the molten resin has flowed into an outer groove, the molten resin can be easily charged in the groove.

Figure 3:
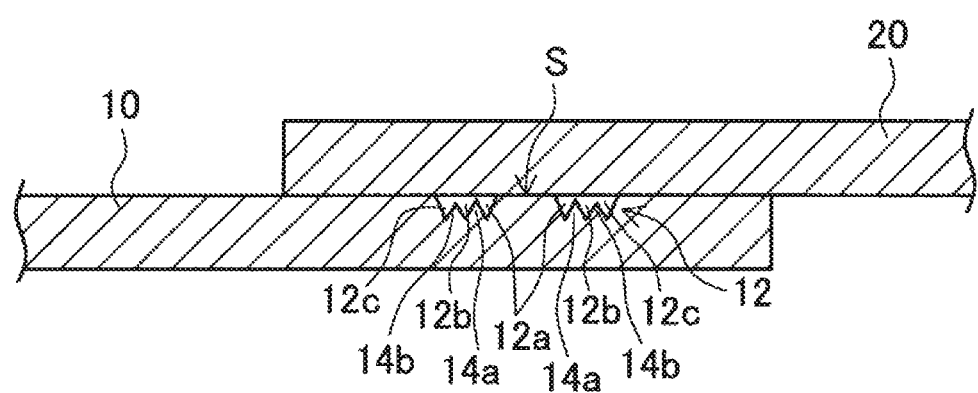
FIG. 3 is an illustration diagram illustrating an instance of walls with different heights.

The heights of the apices of the first wall 14a and the second wall 14b with the bottom of the groove 12a as a reference position may be lower than the height of the melting start portion S. When the heights of the apices of the first wall 14a and the second wall 14b are lower than the height of the melting start portion S, melting can be surely made from the melting start portion S during ultrasonic welding. The height of the apex of the second wall 14b may be lower than the height of the apex of the first wall 14a. That is, as illustrated in FIG. 3, the height of the apex of the wall may decrease as distance from the melting start portion S increases. Thereby, after the melting start portion S has melted during ultrasonic welding, melting can be easily made in a successive manner from the inner wall, and the bonding strength can be improved, centering around the melting start portion S.

The heights of the first wall 14a and the second wall 14b may be lower than the height of the surface of the most part of the first resin member 10 in the bonding area, that is, the surface of the first resin member 10 on the outside of the groove unit 12. When the heights of the first wall 14a and the second wall 14b are lower than the height of the surface of the first resin member 10, the molten resin that flows into the groove unit 12 can easily flow into the second groove 12b or the third groove 12c on the outside while being intercepted. Therefore, lifting of the first resin member 10 from the second resin member 20 by the molten resin can be suppressed more.

Although in the illustrated instance the groove unit 12 is partitioned into the three grooves 12a, 12b, and 12c by the two walls 14a and 14b, the number of partitions is not limited to the instance. The number of walls may be one, or three or more. Accordingly, the number of grooves may be two, or four or more. The first wall 14a and the second wall 14b may not form a circular shape with the melting start portion S as the center, and it is only necessary for the first wall 14a and the second wall 14b to be disposed to cross the direction from the melting start portion S toward the outside. The first wall 14a or the second wall 14b may not be continuous over the entire round.

2. Method for Bonding Resin Members

Hereinabove, the configuration of the first resin member 10 as a resin member according to the example is described. Next, an instance of the method for bonding the first resin member 10 to the second resin member 20 by ultrasonic welding is described as a method for bonding resin members according to the example.

2-1. Ultrasonic Welding According to the Example

Figure 4:
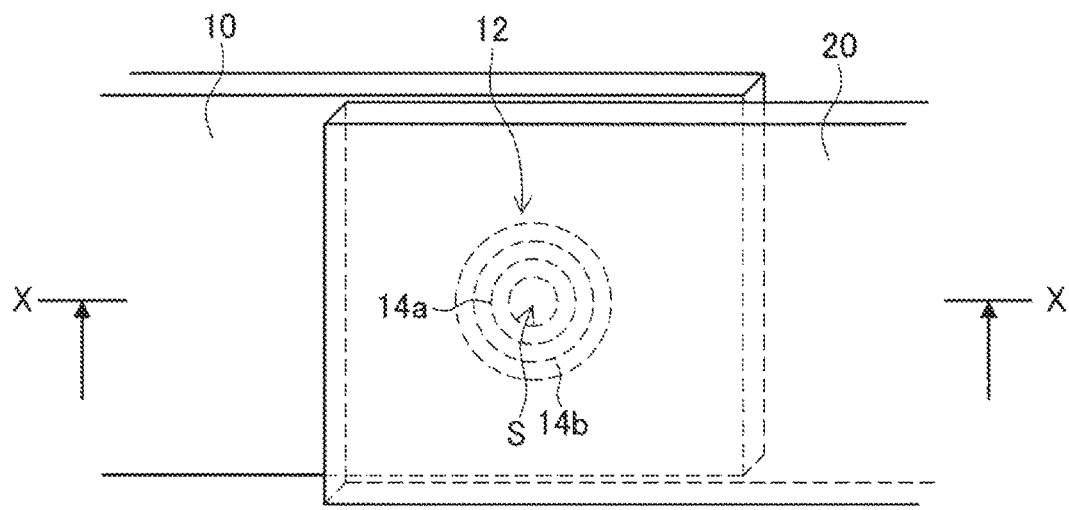
FIG. 4 is an example diagram illustrating a method for bonding resin members according to an example of the present invention.
Figure 4:
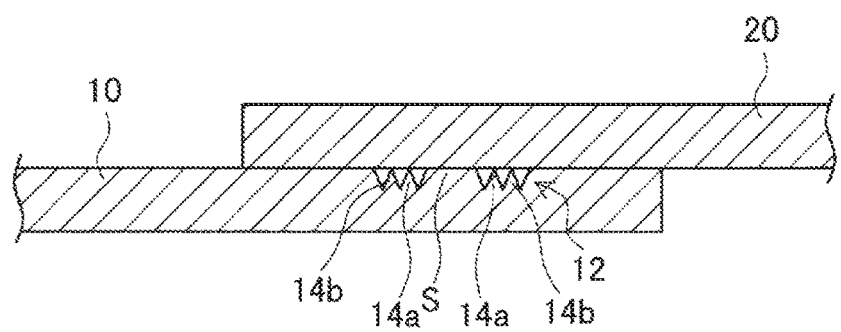
Figure 5:
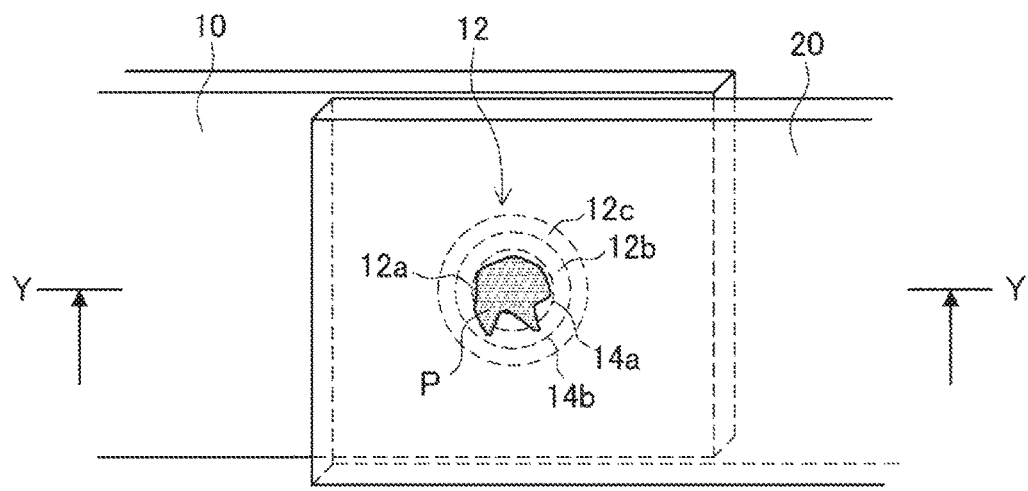
FIG. 5 is an illustration diagram illustrating the method for bonding resin members according to the example.
Figure 5:
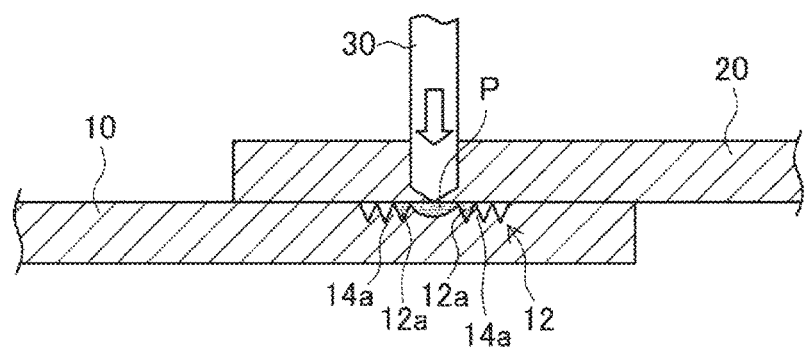
Figure 6:
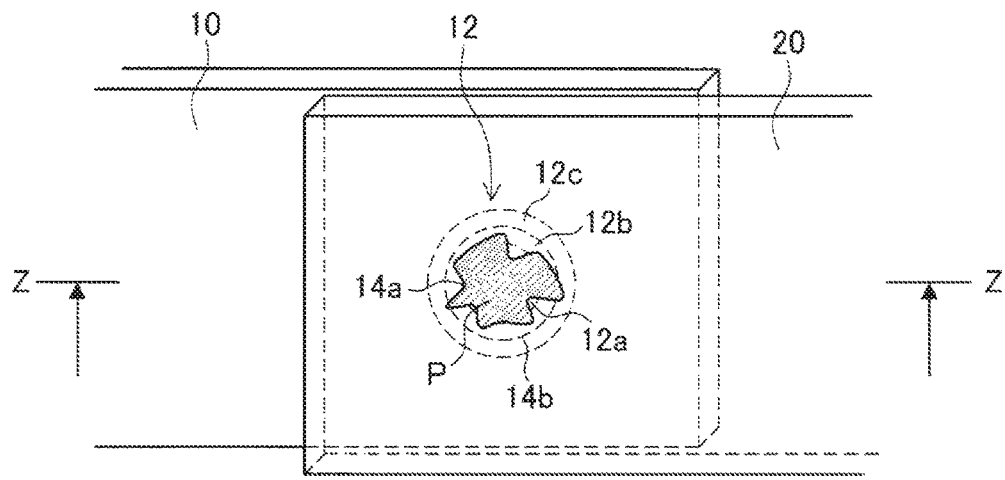
FIG. 6 is an illustration diagram illustrating the method for bonding resin members according to the example.

FIG. 4 to FIG. 7 are illustration diagrams illustrating the manner in which the first resin member 10 is bonded to the second resin member 20. In FIG. 4 to FIG. 6, a diagram of the first resin member 10 and the second resin member 20 superposed as viewed from the second resin member 20 side is illustrated on the upper side, and a cross-sectional view (a diagram of the XX cross section, the YY cross section, or the ZZ cross section as viewed in the arrow direction) of the first resin member 10 and the second resin member 20 is illustrated on the lower side. The cross-sectional view of FIG. 7 corresponds to the cross-sectional views of FIG. 4 to FIG. 6.

The instance of the bonding method is an instance of the ultrasonic welding in which the tip 30 of the ultrasonic welder is inserted into a resin member and ultrasonic vibration is applied to the bonding area to melt the thermoplastic resin; thus, the first resin member 10 and the second resin member 20 are welded. The end shape of the tip 30 used may be of a spot type having an acute shape, or may be of a plane type having a diamond-cut shape.

First, as illustrated in FIG. 4, the first resin member 10 groove and the second resin member 20 are superposed while the bonding surfaces of both are made to face each other, the first resin member 10 having a prescribed melting start portion S, the groove unit 12, and the walls 14a and 14b. In the illustrated instance, the second resin member 20 with its bonding surface faced down is held to be superposed on the first resin member 10 that is mounted with its bonding surface faced up. The first resin member 10 and the second resin member 20 may be turned upside down. Alternatively, both of the first resin member 10 and the second resin member 20 may have a prescribed melting start portion S, the groove unit 12, and the walls 14a and 14b as resin members according to the example. In this state, the tip 30 is pressed while ultrasonic vibration is applied to the position corresponding to the melting start portion S from the upper surface side of the second resin member 20.

Consequently, as illustrated in FIG. 5, the tip 30 enters the second resin member 20 and contact pressure is applied to the melting start portion S of the first resin member 10, and the melting start portion S and a surface of the second resin member 20 in contact with the melting start portion S start to melt. The molten resin P produced at this time first flows into the first groove 12a near to the melting start portion S in the groove unit 12 formed on the first resin member 10. Further, the tip 30 is pressed against the second resin member 20 while ultrasonic vibration is applied; thus, the tip 30 penetrates the second resin member 20 and reaches the first resin member 10.

Consequently, as illustrated in FIG. 6, the melting start portion S of the first resin member 10 and the surface of the second resin member 20 in contact with the melting start portion S melt further. When the amount of molten resin P is thus increased, the first groove 12a is filled with the molten resin P in the direction in which the molten resin P flows out in a large amount, and the molten resin P further goes over the first wall 14a and flows into the second groove 12b. At this time, even when the height of the apex of the first wall 14a is the same as the height of the surface of the melting start portion S, it is likely that contact pressure will be applied to the first wall 14a in a state where the melting start portion S has melted, and the first wall 14a and the surface of the second resin member 20 in contact with the first wall 14a are likely to melt. Therefore, the inflow of the molten resin P from between the first wall 14a and the second resin member 20 into the second groove 12b is not obstructed.

In the method for bonding resin members according to the example, after the entire first groove 12a is filled with the molten resin P, it is not necessary for the molten resin P to flow into the second groove 12b. In the case of a resin member, particularly a member made of a fiber-reinforced resin, since it is likely that variation will occur in the smoothness of the surface, it is difficult to control the position of melting of the first resin member 10 or the second resin member 20 and the amount of molten resin P beforehand. Hence, as illustrated in FIG. 6, it is only necessary for the molten resin P to flow into the second groove 12b after the first groove 12a is filled with the molten resin P, centering around the direction in which the molten resin P flows out in a large amount.

Figure 7:
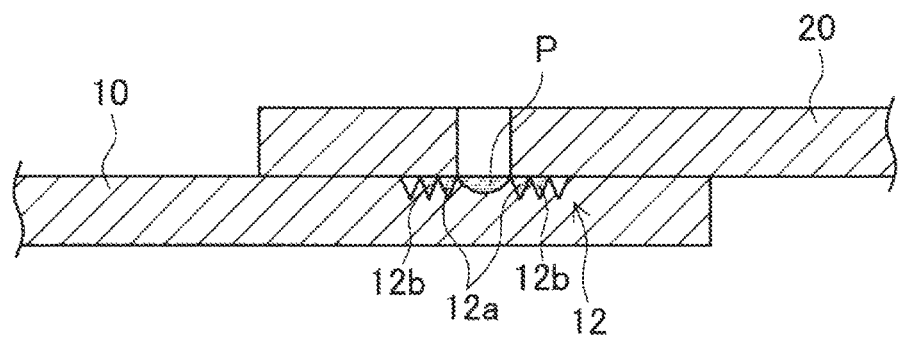
FIG. 7 is an illustration diagram illustrating the method for bonding resin members according to the example.

Then, after a prescribed time that is set beforehand has elapsed from when the tip 30 has started to be pressed against the second resin member 20 or from when the tip 30 has reached the first resin member 10 and the entry of the tip 30 has been stopped, the tip 30 is raised; thus, the ultrasonic welding finishes. Thereby, as illustrated in FIG. 7, the molten resin P starts to cure in a state of being charged in the first groove 12a and the second groove 12b, and the interface of the bonding surface of the first resin member 10 and the bonding surface of the second resin member 20 is welded. In the instance illustrated in FIG. 7, the molten resin P has flowed in up to the second groove 12b.

Thus, by performing ultrasonic welding using the first resin member 10 that has the prescribed melting start portion S, the groove unit 12, and the walls 14a and 14b, the molten resin P is charged into the inner groove while being intercepted by the walls 14a and 14b, and then flows into outer grooves. Therefore, the molten resin P that flows into each groove can be made to surely contribute to the improvement in bonding strength. Upon having been charged in the inner groove, the molten resin P goes over walls and flows into outer grooves. Therefore, lifting of the first resin member 10 from the second resin member 20 by the molten resin P is suppressed. Thus, by the method for bonding resin members according to the example, the creation of a space between the first resin member 10 and the second resin member 20 is suppressed, and the bonding strength between the first resin member 10 and the second resin member 20 is improved by the molten resin P.

2-2. Ultrasonic Welding According to Comparative Example

Figure 8:
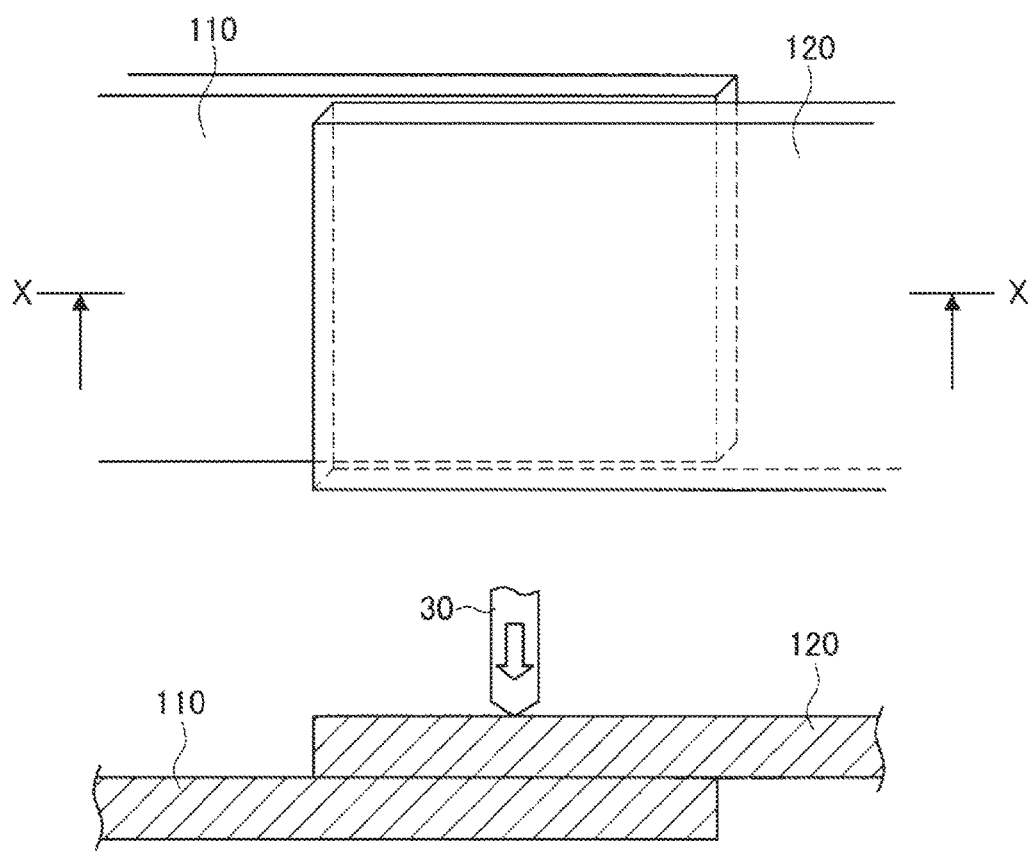
FIG. 8 is an illustration diagram illustrating a method for bonding resin members according to Comparative Example.
Figure 9:
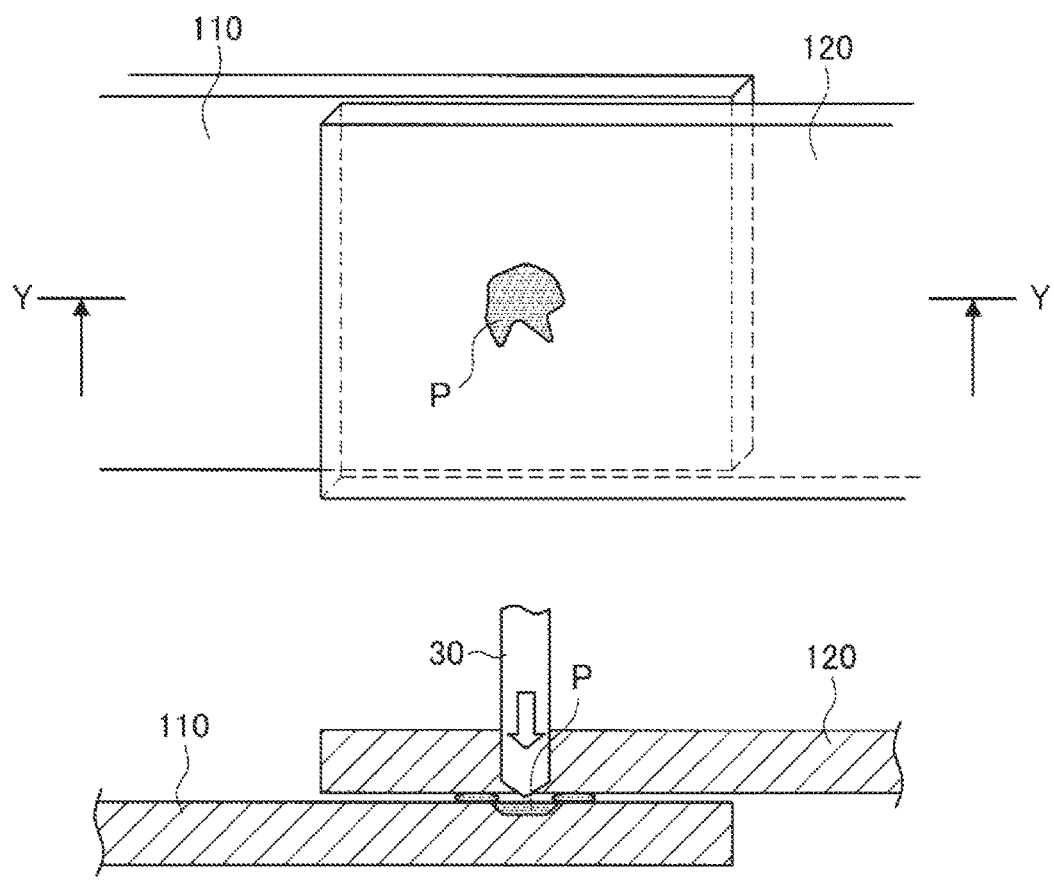
FIG. 9 is an illustration diagram illustrating a method for bonding resin members according to Comparative Example.
Figure 10:
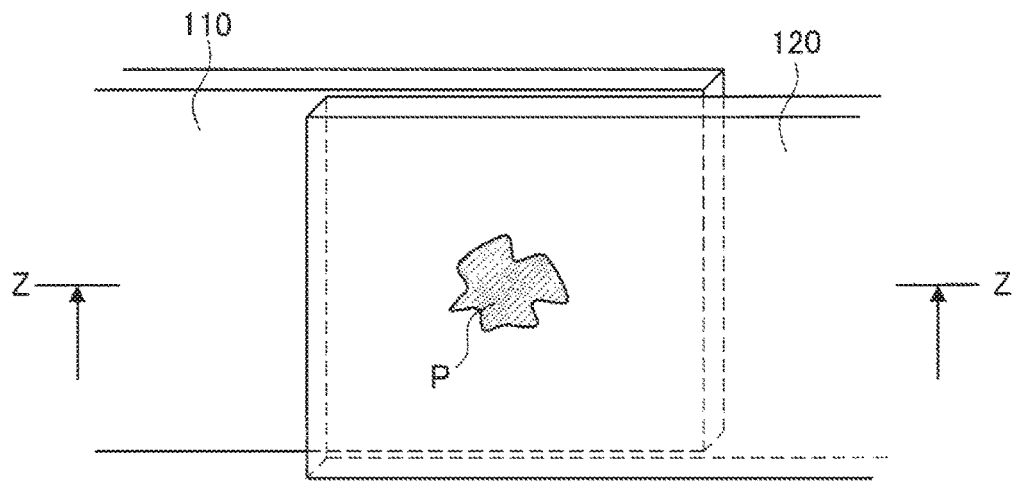
FIG. 10 is an illustration diagram illustrating a method for bonding resin members according to Comparative Example.
Figure 10:
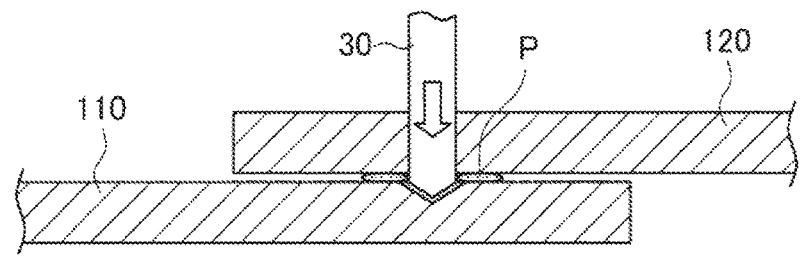

For comparison, Comparative Example will now be described in which resin members that do not have any of the melting start portion, the groove unit, and the wall are bonded by ultrasonic welding. FIG. 8 to FIG. 10 are illustration diagrams illustrating the manner in which a first resin member 110 is bonded to a second resin member 120 in Comparative Example. FIG. 8 to FIG. 10 are diagrams corresponding to FIG. 4 to FIG. 6 illustrating the bonding method according to the example, respectively.

In Comparative Example, first as illustrated in FIG. 8, the bonding surfaces of the first resin member 110 and the second resin member 120 both of which are a flat surface with no unevenness are held facing each other, and in this state the tip 30 of the ultrasonic welder is pressed from the second resin member 120 side while ultrasonic vibration is applied. Consequently, as illustrated in FIG. 9, the bonding surfaces of the first resin member 110 and the second resin member 120 in an area to which contact pressure is applied by the pressing force by the tip 30 start to melt.

After that, the tip 30 continues to be pressed while ultrasonic vibration is applied; thereby, as illustrated in FIG. 10, the tip 30 penetrates the second resin member 120 and reaches the first resin member 110. In the series of processes from FIG. 9 to FIG. 10, since there is no margin for escape of the molten resin P at the interface between the first resin member 110 and the second resin member 120, the first resin member 110 will be lifted from the second resin member by the molten resin P. Therefore, in Comparative Example, although the molten resin P serves as an adhesive between the first resin member 110 and the second resin member 120, a space will be created between the first resin member 110 and the second resin member 120, and the thickness of the interface of the bonding area will be increased.

3. Effect

With regard to the resin member and the method for bonding resin members according to the example described above, the resin member (the first resin member 10) has the melting start portion S, the groove unit 12, and the first wall 14a and the second wall 14b that partition the groove unit 12 into the first groove 12a, the second groove 12b, and the third groove 12c. Thereby, the melting start position to which contact pressure is applied by the ultrasonic welder is specified. Furthermore, since the groove unit 12 that is formed so as to surround the periphery of the melting start portion S is partitioned by the walls 14a and 14b, the molten resin P produced by ultrasonic welding flows in successively from the first groove 12a near to the melting start portion S while being intercepted by the walls 14a and 14b.

Therefore, in an area of the groove unit where the molten resin P flows in, the molten resin P is in contact with both of the first resin member 10 and the second resin member 20, and the molten resin P surely contributes to the improvement in bonding strength. Furthermore, when the molten resin P has been charged in a prescribed inner groove, the molten resin P goes over walls and successively flows into outer grooves; consequently, lifting of the first resin member 10 from the second resin member 20 by the molten resin P is suppressed. Thus, by the resin member and the method for bonding resin members according to the example, the molten resin P produced during ultrasonic welding surely contributes to the improvement in bonding strength, and meanwhile the increase in the thickness of the interface of the bonding area is suppressed.

4. Modification Examples

Some Modification Examples of the resin member (the first resin member 10) according to the example will now be described.

4-1. Modification Example 1

Figure 11:
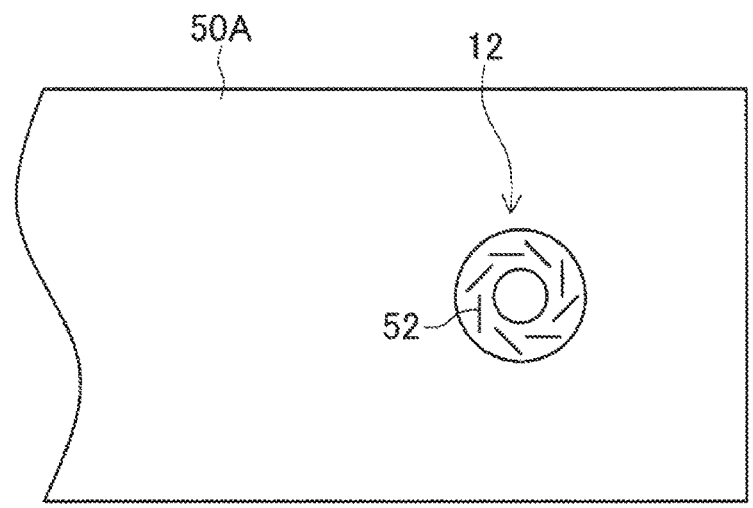
FIG. 11 is an illustration diagram illustrating a configuration of a resin member according to Modification Example 1.

FIG. 11 is a plan view illustrating the bonding surface of a resin member 50A according to Modification Example 1. The resin member 50A according to Modification Example 1 has, in the groove unit 12, a plurality of walls 52 extending in the directions of tangent lines to a possible circle that is set with the melting start portion S as the center. Each wall 52 is formed so as to cross the direction from the melting start portion S toward the outside, and in each position, partitions the groove unit 12 into the inner portion near to the melting start portion S and the outer portion far from the melting start portion S. When the wall 52 is not continuous over the entire round of the melting start portion S, the length of each wall 52 is preferably 3.0 mm or more, for instance. If the length of the wall 52 is too short, the effect of intercepting molten resin may not be obtained.

Also in the case of the resin member 50A according to Modification Example 1, the molten resin produced during ultrasonic welding flows from the inner portion of the groove unit 12 successively into outer portions while being intercepted by the walls 52. Therefore, also in the case of the resin member 50A according to Modification Example 1, the molten resin produced during ultrasonic welding surely contributes to the improvement in bonding strength, and meanwhile the increase in the thickness of the interface of the bonding area is suppressed.

4-2. Modification Example 2

Figure 12:
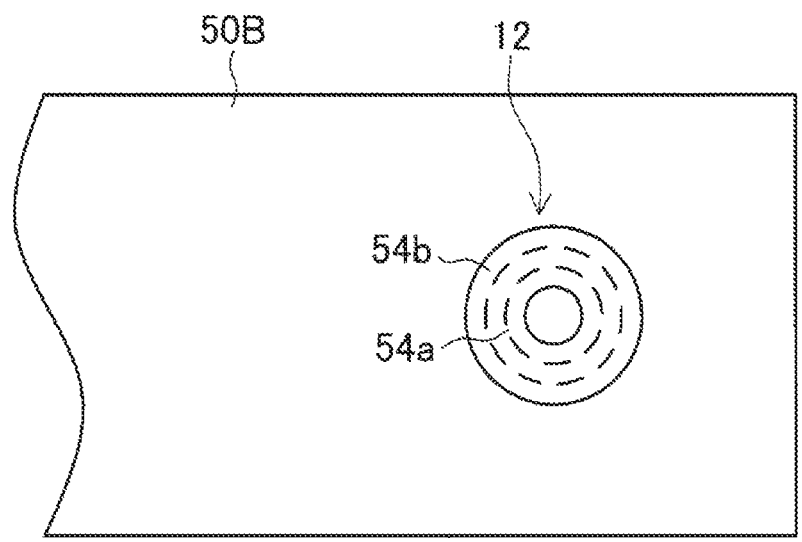
FIG. 12 is an illustration diagram illustrating a configuration of a resin member according to Modification Example 2.

FIG. 12 is a plan view illustrating the bonding surface of a resin member 50B according to Modification Example 2. The resin member 50B according to Modification Example 2 is an instance in which the first wall 14a and the second wall 14b in the first resin member 10 in the example described above are made discontinuous, in other words, walls 54a and 54b that are formed intermittently are provided. Also in Modification Example 2, the length of each of the walls 54a and 54b is preferably 3.0 mm or more, for instance. Also in the case of the resin member 50B according to Modification Example 2, the molten resin produced during ultrasonic welding flows from the inner portion of the groove unit 12 successively into outer portions while being intercepted by the walls 54a and 54b. Therefore, also in the case of the resin member 50B according to Modification Example 2, the molten resin produced during ultrasonic welding surely contributes to the improvement in bonding strength, and meanwhile the increase in the thickness of the interface of the bonding area is suppressed.

4-3. Modification Example 3

Figure 13:
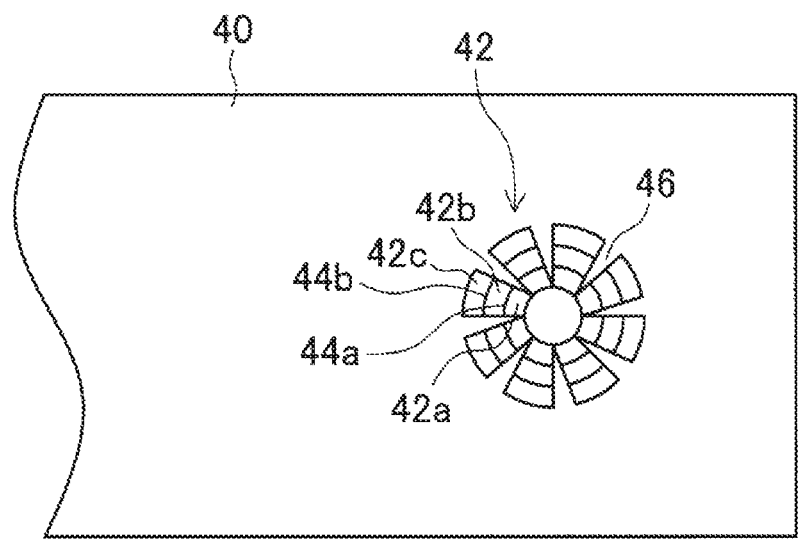
FIG. 13 is an illustration diagram illustrating a configuration of a resin member according to Modification Example 3.

FIG. 13 is a plan view illustrating the bonding surface of a resin member 40 according to Modification Example 3. In the case of the resin member 40 according to Modification Example 3, a groove unit 42 is partitioned by walls 44a and 44b, and grooves 42a, 42b, and 42c form a concentric circular configuration as a whole. However, unlike the grooves 12a, 12b, and 12c of the first resin member 10 according to the example described above, the grooves 42a, 42b, and 42c are disposed discontinuously around the melting start portion S. Also in the case of the resin member 40 according to Modification Example 3, the molten resin produced during ultrasonic welding flows from the inner portion of the groove unit 42 successively into outer portions while being intercepted by the walls 44a and 44b. Therefore, also in the case of the resin member 40 according to Modification Example 3, the molten resin produced during ultrasonic welding surely contributes to the improvement in bonding strength, and meanwhile the increase in the thickness of the interface of the bonding area is suppressed.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For instance, the entire configuration of the groove unit or the shape of each groove partitioned by the wall is not limited to the instances described in the above examples. Furthermore, the number of grooves partitioned by the wall is not limited to the instances described in the above examples, either. The shape and number of grooves may be appropriately set in accordance with the possible position of resin melting and the possible amount of molten resin.

The invention claimed is:

1. A first resin member, comprising:
   a bonding area, the bonding area containing a thermoplastic resin and configured to be bonded to a second resin member by ultrasonic welding,
   wherein the bonding area comprises:
      a first surface, wherein an entirety of the first surface is at a first elevation;
      a second surface, wherein the second surface is at a second elevation, and wherein the second surface surrounds the first surface;
      a groove unit located between an inner periphery and an outer periphery, the outer periphery surrounding the inner periphery,
         wherein the first surface is bounded by and located within the inner periphery,
         wherein the outer periphery delimits an inner boundary of the second surface, and
         wherein the groove unit comprises a bottom at a third elevation that is lower than the first elevation and the second elevation; and
      a plurality of concentric walls located within the groove unit and projecting from the bottom of the groove unit,
         wherein each of the plurality of concentric walls surrounds the inner periphery,
         wherein each of the plurality of concentric walls is surrounded by the outer periphery,
         wherein a fourth elevation of an apex of each of the plurality of concentric walls is:
            a) lower than the second elevation of the second surface, and
            b) lower than or the same as the first elevation of the first surface,
         wherein at least the first surface, the second surface, and the plurality of concentric walls comprise the thermoplastic resin, and
         wherein a difference in elevation between the second elevation and the third elevation is in a range of 0.5 mm to 1.0 mm.

2. The first resin member according to claim 1, wherein the fourth elevation of the apex of each of the plurality of concentric walls is lower than the first elevation of the first surface.

3. The first resin member according to claim 1, wherein a first size of the first surface corresponds to a second size of a tip of an ultrasonic welder used for the ultrasonic welding.

4. The first resin member according to claim 2, wherein a first size of the first surface corresponds to a second size of a tip of an ultrasonic welder used for the ultrasonic welding.

5. The first resin member according to claim 1, wherein among the plurality of concentric walls, any first wall that is more proximal to the first surface has a first apex located at a fifth elevation greater than a sixth elevation of a second apex of a second wall that is more distal to the first surface.

6. A method for bonding the first resin member and the second resin member according to claim 1 by ultrasonic welding, the method comprising:
   contacting the bonding area of the first resin member with a surface of the second resin member; and
   applying contact pressure to the first surface of the first resin member with a vibration element to bond the two resin members.

* * * * *